No. 755,964. PATENTED MAR. 29, 1904.
A. V. SWANSON.
VEHICLE POLE TIP.
APPLICATION FILED MAR. 10, 1902.
NO MODEL.
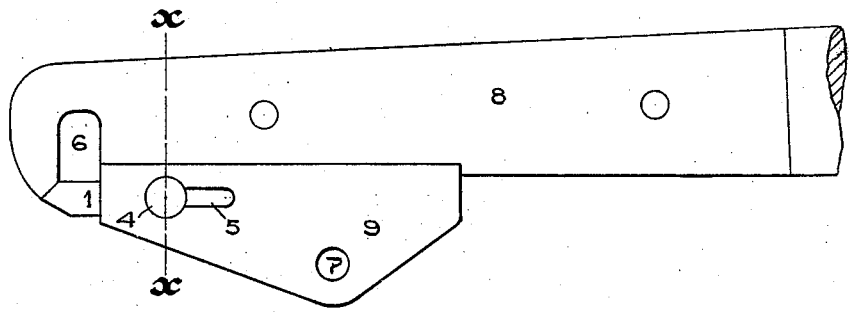
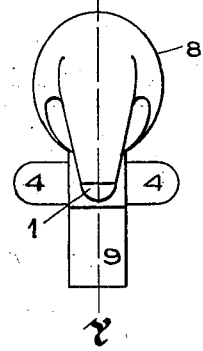 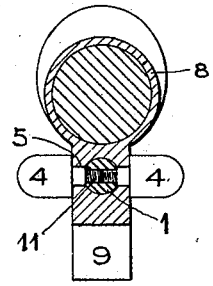
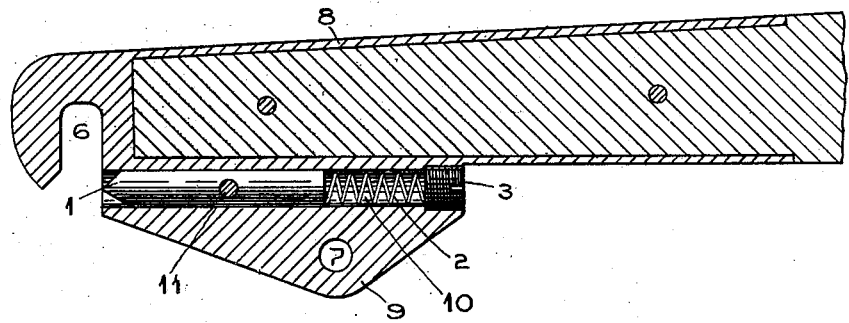
Witnesses,
W. H. Palmer
Emily F. Otis
Inventor,
Albert V. Swanson.
by Lothrop & Johnson
his Attorneys.

No. 755,964. Patented March 29, 1904.

UNITED STATES PATENT OFFICE.

ALBERT V. SWANSON, OF MINOT, NORTH DAKOTA.

VEHICLE-POLE TIP.

SPECIFICATION forming part of Letters Patent No. 755,964, dated March 29, 1904.

Application filed March 10, 1902. Serial No. 97,664. (No model.)

*To all whom it may concern:*

Be it known that I, ALBERT V. SWANSON, a citizen of the United States, residing at Minot, in the county of Ward and State of North Dakota, have invented a new and useful Safety Vehicle-Pole, of which the following is a specification.

My invention relates to improvements in tongue-tips; and it consists in the features of construction hereinafter particularly described and claimed.

In the accompanying drawings, forming part of this specification, Figure 1 is a side elevation of my improved tongue-tip. Fig. 2 is an end view of the same. Fig. 3 is a section on line $x$ $x$ of Fig. 1, and Fig. 4 is a section on line $y$ $y$ of Fig. 2.

In the drawings, 8 represents a tubular socket, of malleable iron, shaped to fit over the end of a wagon or buggy pole. The said socket is formed in its closed end with a recess 6 to receive the neck-yoke ring. The tongue-tip is formed upon its under side with a downwardly-projecting wing 9, provided with an opening 7 to receive a ring (not shown) to run a lead-rod through for heavy wagons. In the upper portion of the wing 9 is a longitudinal groove 10, closed at its rear end by a plug 3. Within said groove is a slidable bolt 1, normally held in forward position, as shown in Fig. 1, by a coiled spring 2. I provide a pin 11, passing through the bolt 1 and through slots 5 in the opposite sides of the wing, buttons 4 being secured upon the ends of said pin, by means of which the bolt may be withdrawn.

By means of the plug 3 the bolt and spring are securely held within the groove, said plug being removed to allow the bolt and spring to be placed in position.

Among the advantages of my construction are my arrangement of the bolt and spring in the groove, the means for sliding the bolt, and the wing 9 for holding the tongue-tip out of contact with the ground when the pole is lowered.

I claim—

1. A tongue-tip comprising a metal socket provided with a recess in one end, a spring-actuated bolt slidable in a groove in said socket and normally held by its spring in position closing said recess, a plug closing the rear end of said groove, said plug being removable to allow the removal of the spring and bolt through the rear end of the groove, and actuating-handles extending outwardly from the opposite sides of said bolt.

2. A tongue-tip comprising a metal socket provided with a recess in its closed end, a spring-actuated bolt slidable in said socket to close said recess, and a wing projecting downwardly from said socket sufficiently to rest upon and hold the end of the tongue out of contact with the ground, said wing being formed with a transverse opening below said bolt.

In testimony whereof I have signed my name to this specification in the presence of two subscribing witnesses.

ALBERT V. SWANSON.

Witnesses:
R. W. JONES,
J. S. MURPHY.